United States Patent

[11] 3,590,521

| [72] | Inventor | Harvey W. Samo<br>Maplewood, N.J. |
|---|---|---|
| [21] | Appl. No. | 808,138 |
| [22] | Filed | Mar. 18, 1969 |
| [45] | Patented | July 6, 1971 |
| [73] | Assignee | Margon Corporation<br>Rahway, N.J. |

[54] SIDE-TO-SIDE ROLLING DOLL EYE
6 Claims, 6 Drawing Figs.

[52] U.S. Cl. .................................................. 46/167
[51] Int. Cl. .................................................. A63h 3/40
[50] Field of Search .......................................... 46/167–169

[56] References Cited
UNITED STATES PATENTS

| 2,039,928 | 5/1936 | Popovich | 46/168 |
| 2,657,500 | 11/1953 | Samolewitz | 46/169 |
| 2,931,138 | 4/1960 | Brudney | 46/167 |
| 3,421,255 | 1/1969 | Brudney | 46/167 |

*Primary Examiner*—Louis G. Mancene
*Assistant Examiner*—J. A. Oliff
*Attorney*—James and Franklin ABSTRACT: A side-to-side rolling doll eye assembly mounted in a housing for pivotal rolling movement therein about a vertical axis, the eye member comprising a transparent doll eye component embodying a front lens part having a reflective iris portion and a transparent pupil portion. The pupil portion of the eye is formed integrally with an inwardly extended stem and the weight for the eye member is provided by a weight element attached to and localized at the stem.

PATENTED JUL 6 1971 3,590,521
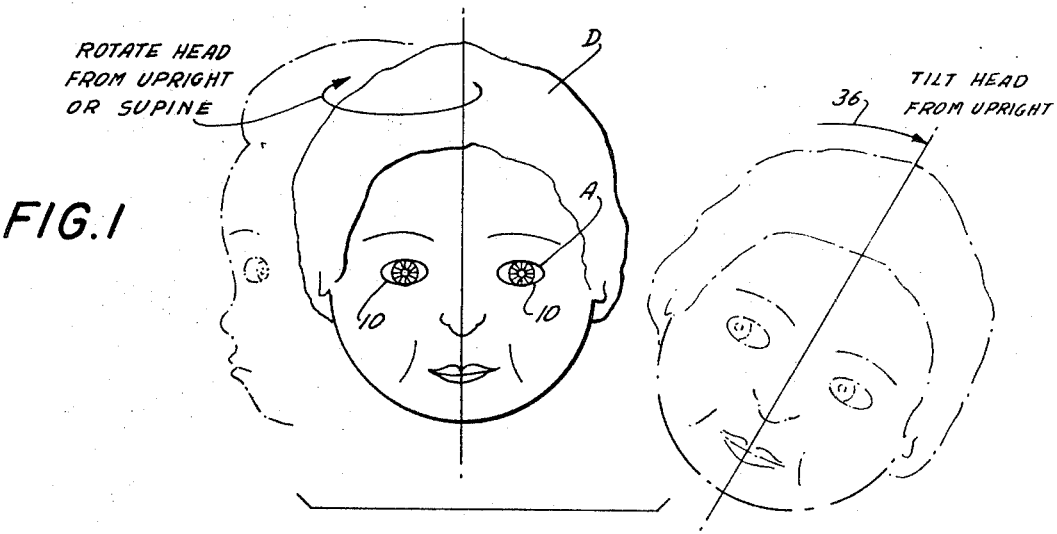
FIG.1
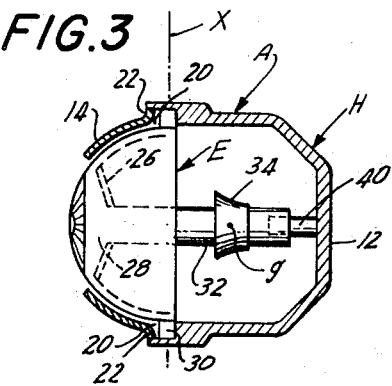
FIG.3
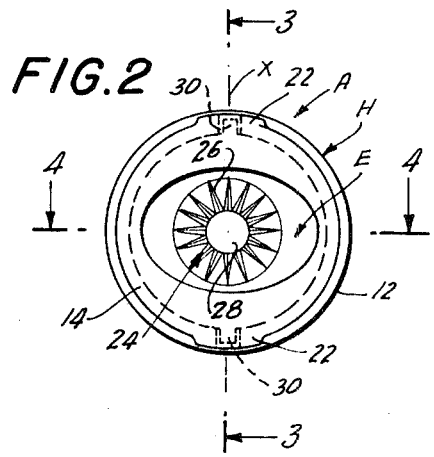
FIG.2
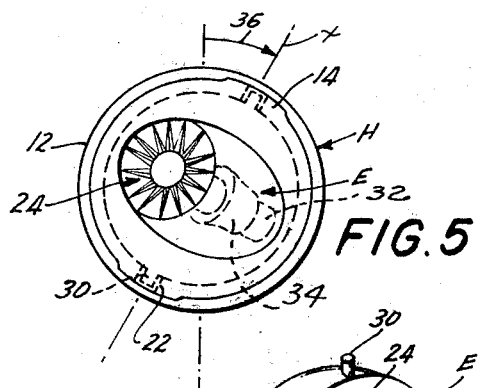
FIG.5
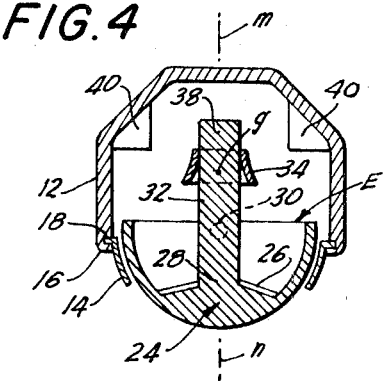
FIG.4
FIG.6
INVENTOR
HARVEY W. SAMO
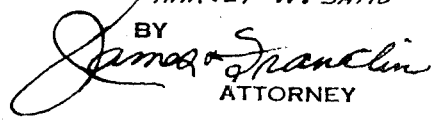
BY
ATTORNEY

SIDE-TO-SIDE ROLLING DOLL EYE

This relates to doll eyes and more particularly to a side-to-side rolling doll eye.

The doll eye of the invention is adapted for use in a flexible doll head having individual sockets to receive individual eye assemblies; and each doll eye assembly embodies a housing mountable in an socket of the doll head, the eye member thereof being pivotally mounted in the housing for pivotal rolling movement therein about a vertical axis. The weight of the eye member is distributed with reference to its pivotal mounting, such that the eye member, normally open and in a state of equilibrium with the doll head in either upright or supine position moves sidewise and from side-to-side in the eye assembly when the doll head is tilted or rotated when in upright position or is rotated when in supine position.

The principal object of the invention is the provision of such an eye assembly in which the eye member comprises a transparent doll eye shell component embodying a front lens part having a reflexive iris portion and a transparent pupil portion. The pupil portion is formed integrally with an inwardly extending stem projecting into the housing of the eye assembly, and the weight for the eye member is provided by a weight element attached to and localized at, as by being encircled about, the stem at an inward region thereof beyond the vertical pivotal axis. By means of this construction, the transparent and nonreflective character of the pupil of the eye member remains unobstructed, the weight element, which may consist of a commercial eyelet, or metal tube or similar simple device, may be wrapped about or pressed onto the stem, being there localized, requiring a minimum of special tooling and affording easy and fast weight-and-eye shell assembling.

To the accomplishment of the foregoing objects and such other objects as may hereinafter appear, the present invention relates to a side-to-side rolling doll eye as disclosed herein and defined in the accompanying claims taken together with the following description and the appended drawings, in which:

FIG. 1 is a view of a doll head in which individual eye assemblies of the present invention are embodied, FIG. 1 depicting the side as well as side-to-side movements of the doll eye that take place when the doll is tilted from an upright position or is rotated when in either upright or in supine position;

FIG. 2 is a front elevational view of the doll eye assembly of the present invention;

FIG. 3 is a side elevational view of the doll eye assembly shown partly in section and taken in cross section in the plane of the line 3—3 of FIG. 2;

FIG. 4 is a top plan view thereof shown in section and taken in the plane of the line 4—4 of FIG. 2;

FIG. 5 is a front elevational view similar to that shown in FIG. 2 with the eye member tilted, however, from an upright position producing a side movement of the eye member in its assembly; and FIG. 6 is a perspective view of the eye member showing also a modification thereof.

Referring now more in detail to the drawings, the eye assembly generally designated as A is of the type for use in a flexible plastic doll head having individual eye sockets 10, 10 formed to receive individual eye assemblies such as A as generally depicted in FIG. 1 of the drawings in the manner more particularly disclosed in the patent to Wolfe U.S. Pat. No. 2,696,064, patented Dec. 7, 1954. As hereinafter set forth the assembling of the parts of the eye assemblies A is also similar to that disclosed in said Pat. No. 2,696,064.

The doll eye assembly A of the present invention comprises a housing generally designated as H mountable, as above indicated in each of the eye sockets 10, 10 of the doll head, and an eye member E pivotally mounted within and at the front of the said housing, the pivotal mounting being about a vertical axis x lying in a medial plane m (see particularly FIG. 4) of the eye assembly.

The housing H is preferably made in two parts and comprises a back cover 12 and a front cover 14, the back cover being preferably a plastic component and the front cover being preferably a metallic component. The front cover 14 after the eye assembly E is mounted in the housing H is attached to the back cover by indenting the front peripheral edge 16 of the back cover over the annular flange portions 18 formed in the front cover as shown particularly in FIG. 4 of the drawings. The back cover 12 is formed with opposed bearing slots 20, 20 and the front cover 14 is provided with cooperating ledge parts 22, 22 (see particularly FIGS. 2, 3 and 5) for a purpose to be referred to hereinafter.

The eye member E, separately shown in FIG. 6, comprises a preferably all plastic transparent shell component, hemispherical in structure and form, and formed to embody a front lens part generally designated as 24 having a reflective iris portion 26 and a transparent (nonreflective) central pupil portion 28, the iris and pupil portions being designed to embody the invention disclosed in the patent to Samolewitz U.S. Pat. No. 2,657,500 of Nov. 3, 1953. In this type of eye element structure the reflective iris portion 24 is serrated as depicted in the drawings by radial grooves which are effective for reflecting incident light and the pupil portion 28 is nonreflective or transparent so as to admit incident light. The eye member E is formed with trunnions 30, 30 which in the assembling of the parts are received in the bearing slots 20, 20 of the housing cover 12 and are held therein by the ledges 22, 22 formed in the front cover 14, the structure and assembling of these parts being similar to that disclosed in the said Wolfe et al. U.S. Pat. No. 2,696,064.

The pupil portion 28 of the eye member is formed integrally with an inwardly extending stem 32 projecting into the housing H of the eye assembly as is most clearly shown in FIGS. 2 to 6 of the drawings. This integral stem 32 is also characterized by being transparent and nonreflective to incident light. However, when the eye element is mounted in the housing, the dark background provided thereby imparts to the pupil its desired black appearance.

The eye member E is weighted for producing the side-to-side rolling actions thereof; and for this purpose the weight for the eye member is provided by a weight element 34 attached to and localized at, as by being encircled about, the pupil-extending stem 32 at an inward region thereof beyond the vertical pivotal axis x of the eye member as is clearly shown in FIGS. 3 to 6 of the drawings. The weight element 34 may consist simply of a commercial eyelet or metal tube pressed onto the pupil stem or may consist simply of a wire wrapped around the pupil stem. By means of this construction, the transparent and nonreflective character of the pupil 28 of the eye member remains unobstructed and the weight element 34 being mounted directly on or attached to the stem 32 and therefore localized thereat affords easy and fast weight-and-eye shell assembling. Also by means of this simple structure the center of gravity of the eye member E is localized at or close to the weight element 34 and at a point designated as g (see particularly FIGS. 3 and 4).

By means of this recited structure the weight of the eye member E is distributed symmetrically about the vertical pivotal axis x and is also so distributed that its center of gravity lies in the region of the attached weight 34, the center of gravity being located in the medial plane m of the eye member.

With this construction thus far described the eye member E by virtue of its pivotal mounting and the weight distribution thereof as described is normally in a state of equilibrium in its eye shell mounting. With this construction when the doll head is moved from upright to a supine position, the eye member remains in its position of equilibrium and remains open. When the doll head is rotated rapidly from an upright position or when rotated from a supine position, either clockwise or counterclockwise, the eye member remains in its position of equilibrium due respectively to inertia and gravity and therefore, in relation to the movement of the doll head, gives the appearance of rolling to one side or the other, FIG. 1 depicting the rotation of the doll head (in either erect or supine position) in a clockwise direction, the eye member giving the appearance of rolling in a counterclockwise direction. When the doll head D, in upright position, is tilted either in one direction or the other, an apparent rolling movement of the eyes also is effected; as shown in FIG. 1 when the doll head is tilted to the right in the direction of the arrow 36, the eye members give the appearance of rolling to the left. This action is also indicated in FIG. 5 of the drawings; in this latter action the weight distribution is effective for moving the eye member relative to the tilted head in the manner best shown in FIG. 5 of the drawings.

The disclosed structure of the eye member with its extended stem 32 also serves as a means for providing stops for the side-to-side rolling action of the eye member. This is accomplished by having the inner end 38 engage the sidewalls of the back housing cover 12, which may be provided with stub parts 40, 40 integral with the housing back 12 for coaction with the end 38 of the stem 32 to define such stops for the side-to-side movement of the eye member.

If desired, as shown in FIG. 6 of the drawings, the end 38 of the eye stem 32 may be coated with a black film 42 to produce the black background for the eye member (normally provided by the darkened interior of the eye housing H).

Although in the stated preferred structure form, the eye member comprises a preferably all plastic transparent component embodying a front lens part having a reflective iris portion and a transparent pupil portion, it will be evident that due to the other structural advantages obtained, the eye member may comprise other forms embodying a pupil portion in which the pupil portion is formed integrally with the described inwardly extending pupil portion and its attached weight element.

The structure and the relation of the parts which characterize the elements of the eye assembly of the present invention, the functioning of the eye member to produce the side movements as well as the side-to-side rolling movements of the eye member when incorporated into a doll head in response to various movements imparted to the doll head and the advantages of the provided structure which embodies the lens pupil stem extension and the weight localized thereon will be apparent from the above detailed description of the structure of the eye assembly and the diagrammatic representations of the operations thereof.

I claim:

1. A side-to-side rolling doll eye assembly for use in a doll head having individual sockets to receive individual eye assemblies, each eye assembly comprising an eye member mountable in the doll head for pivotal rolling movement therein about a vertical axis, said eye member comprising a doll eye component embodying a pupil portion, the pupil portion being formed integrally with a single extended stem centrally located on said pupil portion and projecting inwardly of the eye member, and a weight element for the eye member attached to and localized at the stem at a region thereof substantially beyond the said vertical pivotal axis.

2. The side-to-side rolling doll eye of claim 1, in which each eye assembly comprises a housing mountable in the eye socket of the doll head and the eye member is mounted in said housing for pivotal rolling movement therein about the said vertical axis, and in which the extended stem of the pupil portion projects inwardly into said housing.

3. The side-to-side doll eye of claim 1, in which the doll eye comprises a transparent doll eye component embodying a front lens part having a reflective iris portion and a transparent pupil portion.

4. The side-to-side rolling doll eye of claim 2, in which the stem projects inwardly of the housing for a distance such that the inner end of the stem coacts with the wall of the housing to define stops for the side-to-side rolling action of the eye member.

5. The rolling doll eye of claim 1, in which the weight element comprises a concentrated weight member encircling the stem.

6. The side-to-side rolling doll eye of claim 1, in which the weight of the eye member is distributed symmetrically about the vertical axis, the weight of said eye member being also distributed so that its center of gravity is located close to the said weight element.